United States Patent
Acun

(10) Patent No.: US 11,205,018 B2
(45) Date of Patent: Dec. 21, 2021

(54) DEVICE IDENTIFICATION VIA CHIP MANUFACTURING RELATED FINGERPRINTS

(71) Applicant: International Business Machines Corporation, Armonk, NY (US)

(72) Inventor: Bilge Acun, Menlo Park, CA (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 16/276,227

(22) Filed: Feb. 14, 2019

(65) Prior Publication Data
US 2020/0265168 A1    Aug. 20, 2020

(51) Int. Cl.
G06F 21/73    (2013.01)
G06F 21/44    (2013.01)
G06F 1/28    (2006.01)

(52) U.S. Cl.
CPC .............. G06F 21/73 (2013.01); G06F 1/28 (2013.01); G06F 21/44 (2013.01)

(58) Field of Classification Search
CPC . G06F 21/73; G06F 21/44; G06F 1/28; H04L 9/0866; H04L 9/0894; H04L 63/0876
See application file for complete search history.

(56) References Cited

U.S. PATENT DOCUMENTS

| | | | |
|---|---|---|---|
| 7,757,083 B2 | 7/2010 | Devadas et al. | |
| 7,907,722 B2 | 3/2011 | Timmermans | |
| 8,850,281 B2 | 9/2014 | Potkonjak | |
| 9,032,476 B2 | 5/2015 | Potkonjak | |
| 9,036,891 B2 | 5/2015 | Cobb et al. | |
| 9,262,632 B2 | 2/2016 | Reed et al. | |
| 9,268,938 B1 | 2/2016 | Gonzalez et al. | |
| 9,759,757 B2 | 9/2017 | House et al. | |
| 9,886,583 B2 | 2/2018 | Aguayo Gonzalez et al. | |
| 2012/0226463 A1 | 9/2012 | Keller, III et al. | |
| 2012/0278014 A1* | 11/2012 | Davies | G01D 4/00 702/61 |
| 2015/0317475 A1* | 11/2015 | Aguayo Gonzalez | G06F 21/55 726/23 |
| 2016/0338170 A1* | 11/2016 | Lebel | H05B 45/28 |
| 2017/0220022 A1* | 8/2017 | Hankendi | G06F 1/20 |
| 2018/0052988 A1* | 2/2018 | Ariyoshi | G06Q 10/06 |
| 2018/0262991 A1* | 9/2018 | Rao | H04L 43/0817 |
| 2019/0101968 A1* | 4/2019 | Song | G06F 1/28 |
| 2020/0089866 A1* | 3/2020 | Aguayo Gonzalez | G06F 21/52 |

OTHER PUBLICATIONS

Nist, "Cloud Computing", http://csrc.nist.gov/groups/SNS/cloud-computing/index.html, Created Dec. 1, 2016, Updated Oct. 6, 2017, 2 pages.

(Continued)

*Primary Examiner* — Nelson S. Giddins
(74) *Attorney, Agent, or Firm* — Scully, Scott, Murphy & Presser, P.C.; Daniel P. Morris

(57) ABSTRACT

A device can be identified using a manufacturing characteristic in the device. Power consumption data associated with a device is received. A power model can be fitted to the power consumption data and at least one parameter is determined based on fitting. A fingerprint of the device can be created based on at least one parameter.

19 Claims, 10 Drawing Sheets

(56) References Cited

OTHER PUBLICATIONS

Dey, S., et al., "AccelPrint: Imperfections of Accelerometers Make Smartphones Trackable", NDSS '14, Feb. 23-26, 2014, 16 pages.
Bojinov, H., et al., "Mobile Device Identification via Sensor Fingerprinting", arXiv:1408.1416v1, Aug. 6, 2014, 4 pages.
Eckersley, P., "How Unique is Your Web Browser?", PETS '10 Proceedings of the 10th International Conference on Privacy Enhancing Technologies, Jul. 21-23, 2010, 19 pages.
Nikiforakis, N., et al., "Cookieless Monster: Exploring the Ecosystem of Web-based Device Fingerprinting", 2013 IEEE Symposium on Security and Privacy (SP), May 2013, pp. 541-555.
Michalevsky, Y., et al., "PowerSpy: Location Tracking using Mobile Device Power Analysis", Proceedings of the 24th USENIX Security Symposium, Aug. 12-14, 2015, pp. 785-800.
Bertran, R., "Systematic energy characterization of cmp/smt processor systems via automated micro-benchmarks", 2012 45th Annual IEEE/ACM International Symposium on Microarchitecture (MICRO), https://upcommons.upc.edu/bitstream/handle/2117/19512/PID2590559.pdf, Accessed on Feb. 14, 2019, 13 pages.
Acun, B., et al., "Variation Among Processors Under Turbo Boost in HPC Systems", ICS '16 Proceedings of the 2016 International Conference on Supercomputing, Jun. 1-3, 2016, pp. 1-13, Article No. 6.
Bhushan, M., et al., "Ring Oscillators", Microelectronic Test Structures for CMOS Technology, Aug. 2011, pp. 173-229, Chapter 6, Springer-Verlag New York.
Bojinov, H., et al., "Mobile Device Identification via Sensor Fingerprinting", arXiv:1408.1416v1, Aug. 6, 2014, 14 pages.
Boning, D., et al., "Models of Process Variations in Device and Interconnect", Design of High Performance Microprocessor Circuits (2000), Aug. 23, 1999, pp. 1-34.
Borkar, S., et al., "Parameter Variations and Impact on Circuits and Microarchitecture", In Proceedings of the 40th Annual Design Automation Conference (DAC 2003), Jun. 2-6, 2003, pp. 338-342.
Brik, V., et al., "Wireless Device Identification with Radiometric Signatures", MobiCom '08, Sep. 14-19, 2008, pp. 116-127.
Chandrakasan, A. P., et al., "Minimizing Power Consumption in Digital CMOS Circuits", Proceedings of the IEEE, Apr. 1995, pp. 498-523, vol. 83, No. 4.
Clark, S. S., et al., "WattsUpDoc: Power Side Channels to Nonintrusively Discover Untargeted Malware on Embedded Medical Devices", Proceedings of the USENIX Workshop on Health Information Technologies, Aug. 12, 2013, pp. 1-11.
Das, A., et al., "Exploring Ways to Mitigate Sensor-Based Smartphone Fingerprinting", arXiv:1503.01874v1, Mar. 6, 2015, pp. 1-17.
Datta, A., et al., "Profit Aware Circuit Design Under Process Variations Considering Speed Binning", IEEE Transactions on Very Large Scale Integration (VLSI) Systems, Jul. 2009, pp. 806-815, vol. 16, No. 7.
Hoffmann, J., et al., "Mobile Malware Detection Based on Energy Fingerprints—A Dead End?", In International Workshop on Recent Advances in Intrusion Detection (RAID 2013), Oct. 23-25, 2013, pp. 1-20.
Jovanovic, B., et al., "Static and Dynamic Power Consumption of Arithmetic Circuits in Modern Technologies", In ETRAN, National Conference (2011), Jun. 2011, 4 pages.
Kim, H., et al., "Detecting Energy-Greedy Anomalies and Mobile Malware Variants", MobiSys '08, Jun. 17-20, 2008, pp. 239-252.
Kohno, T., et al., "Remote Physical Device Fingerprinting", IEEE Transactions on Dependable and Secure Computing Apr.-Jun. 2005, pp. 93-108, vol. 2, No. 2.
Liu, L., et al., "Virus-Meter: Preventing Your Cellphone from Spies", RAID 2009, LNCS 5758, Sep. 2009, pp. 244-264.
Mesa-Martinez, F. J., et al., "Power Model Validation Through Thermal Measurements", ISCA '07, Jun. 9-13, 2007, 10 pages.
Mowery, K., et al., "Pixel Perfect: Fingerprinting Canvas in HTML5", Proceedings of W2SP 2012, May 2012, pp. 1-12.
Munford, A.G., "A Note on the Uniformity Assumption in the Birthday Problem", The American Statistician, Aug. 1977, p. 119, vol. 31, No. 3.
Nakibly, G., et al., "Hardware Fingerprinting Using HTML5", arXiv:1503.01408v3, Mar. 11, 2015, 5 pages.
Nunnikhoven, T. S., "A Birthday Problem Solution for Nonuniform Birth Frequencies", The American Statistician Nov. 1992, pp. 270-274, vol. 46, No. 4.
Osler, P. J., et al., "Design Closure", EDA for IC Implementation, Circuit Design, and Process Technology, Mar. 23, 2016, pp. 295-333, Chapter 13, CRC Press.
Rao, R. R., et al., "Modeling and Analysis of Parametric Yield under Power and Performance Constraints", IEEE Design & Test of Computers, Jul.-Aug. 2005, pp. 376-385.
Remley, K.A., "Electromagnetic Signatures of WLAN Cards and Network Security", 2005 IEEE International Symposium on Signal Processing and Information Technology, Dec. 21, 2005, pp. 484-488.
Sinharoy, B., et al., "IBM POWER8 processor core microarchitecture", IBM Journal of Research and Development, Jan./Feb. 2015, p. 2:1-2:21, vol. 59, No. 1, Paper 2.
Suh, G. E., et al., "Physical Unclonable Functions for Device Authentication and Secret Key Generation", DAC'07, Jun. 4-8, 2007, pp. 9-14.
Teodorescu, R., et al., "Variation-Aware Application Scheduling and Power Management for Chip Multiprocessors", ISCA '08 Proceedings of the 35th Annual International Symposium on Computer Architecture, Jun. 21-25, 2008, 13 pages.
Wang, H., et al., "A Fast Leakage-Aware Full-Chip Transient Thermal Estimation Method", IEEE Transactions on Computers, May 2018, pp. 617-630, vol. 67, No. 5.
Zapater, M., et al., "Leakage and Temperature Aware Server Control for Improving Energy Efficiency in Data Centers", Date '13 Proceedings of the Conference on Design, Automation and Test in Europe, Mar. 18-22, 2013, 4 pages.
Zolotov, V., et al., "Voltage Binning Under Process Variation", 2009 IEEE/ACM International Conference on Computer-Aided Design Digest of Technical Papers, ICCAD '09, Nov. 2-5, 2009, pp. 425-432.

* cited by examiner

LEGEND: PROCESSOR

☐ CPU CORE

△ MEMORY

◯ GRAPHICS CARD

POWER EFFICIENCY SCALE

Efficient        Not Efficient

DEVICE IDENTIFICATION VIA CHIP MANUFACTURING RELATED FINGERPRINTS

BACKGROUND

The present disclosure relates to computers, hardware devices, and more particularly to device identification via chip manufacturing related fingerprints.

Devices may have identifiers, which can be used to identify a device. Device identifiers may include a MAC address, IMEI, identifier by operating systems, serial number. Such identifiers can help in identifying a device in various cases.

BRIEF SUMMARY

A system and method may be provided, which can perform a device identification based on hardware manufacturing differences in a device. A method, in one aspect, may include receiving power consumption data associated with a device. The method may also include fitting a power model to the power consumption data and determining at least one parameter based on the fitting. The method may further include creating a fingerprint of the device based on the at least one parameter.

A method, in another aspect, may include receiving a communication from a device. The method may also include monitoring power consumption of the device. The method may also include, based on the power consumption, identifying the device.

A system, in one aspect, may include at least one hardware processor coupled with a memory device. The at least one hardware processor may be operable to receive power consumption data associated with a device, wherein a manufacturing characteristic of the device contributes to power consumption specified in the power consumption data. The at least one hardware processor may be further operable to fit a power model to the power consumption data and determine at least one parameter based on fitting the power model. The at least one hardware processor may be further operable to create a fingerprint of the device based on the at least one parameter.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and technique are disclosed, which can perform a device identification based on manufacturing differences in device's components such as a processor, core, memory and/or others. For instance, complementary metal-oxide-semiconductor (CMOS) manufacturing differences in devices can be utilized to identify a device. Such differences may be non-alterable, and hence usually cannot be reset or lost. In one embodiment, a system and/or method may determine or detect a power efficiency level associated with a device (e.g., device's core, memory, and/or processor) and fingerprint the device based on its power efficiency level. In one aspect, a device identified based on such a manufacturing characteristic can be used to identify a potential malicious attacker to a computer system or another device. In another aspect, such device identification can be used for authentication purposes.

A hardware fingerprinting method in one embodiment can use CMOS related hardware manufacturing as a fingerprint to identify devices. Hardware manufacturing differences manifest themselves as power variations among the same model hardware components such as processors, graphics cards and memory. These variations can be permanent and can be used as a fingerprint to identify unique devices. In one embodiment, power measurement such as a battery status application programming interface (API) can enable a device to be uniquely identified based on the device's power and performance efficiency characteristics.

In one embodiment, a hardware based fingerprinting method can use power and performance characteristics of a device. An embodiment uses the manufacturing variations, also called process variation, in an integrated circuit (IC) that show itself as power consumption differences among the same-model components. Such random manufacturing variations can occur during the IC fabrication process.

Figure 1A:
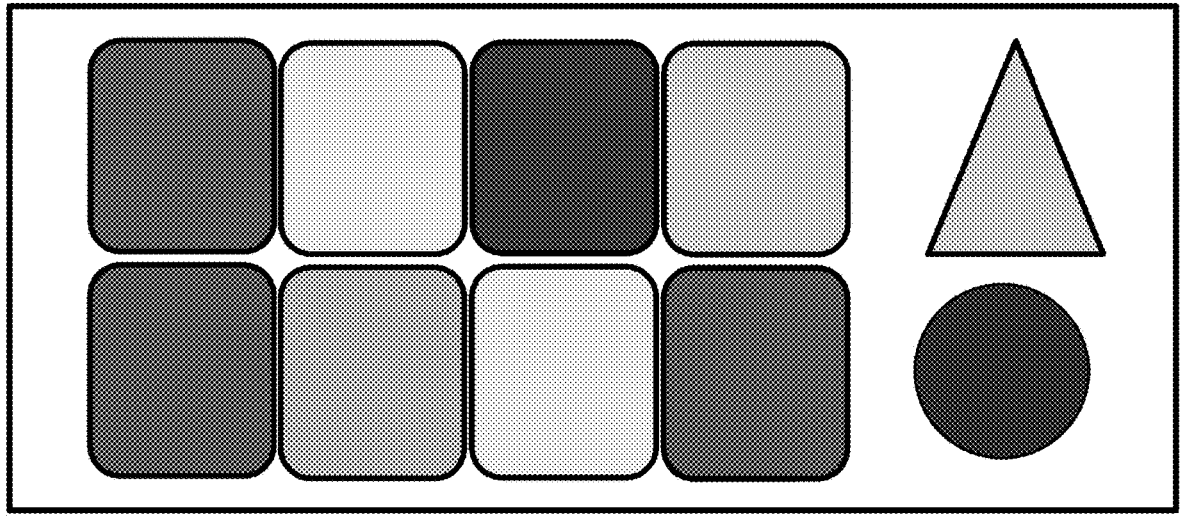
FIG. 1A shows an example device and its components in one embodiment.
Figure 1A:
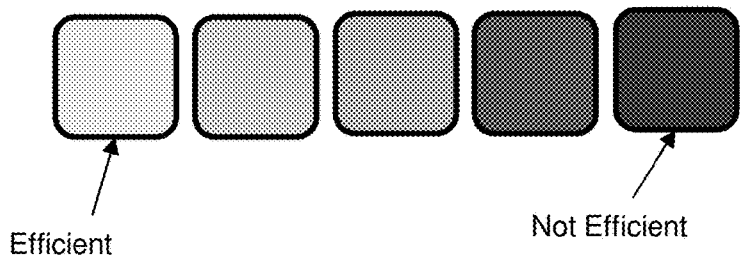
Figure 1B:
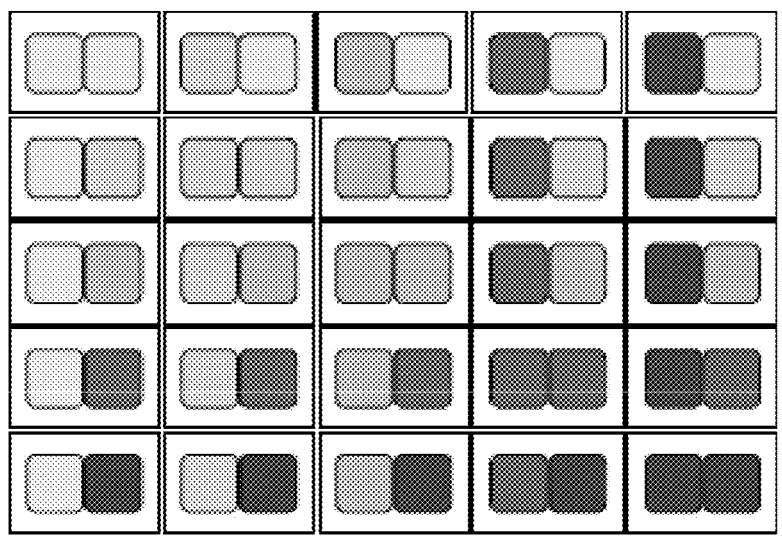
FIG. 1B shows combinations of a two-core CPU with five different power efficiency levels in one embodiment.

An identification mechanism in one embodiment enables to distinguish devices using their power consumption characteristics. In one embodiment, an identification mechanism or fingerprinting mechanism may rely on having multiple components on a device that can be profiled such as individual processing cores, graphics unit, memory unit, and/or others. FIG. 1A shows an example device and its components in one embodiment. The example device illustrated may have 8 cores, a memory and a graphics card. The shadings represent power efficiency levels of the components. FIG. 1B shows combinations of a two-core CPU with five different power efficiency levels. In one aspect, this multiplicity may allow many different combinations of power efficiency so that it can be used to distinguish devices of the same model. In one embodiment, power analysis can be used create fingerprints of same model devices.

Processors may have variability in their power, operational frequency, and temperature. There may be different types of variations affecting microprocessors: e.g., environmental factors and physical factors. Environmental factors happen during the activity of the chip due to variations in power supply, switching activity and temperature of the cores. Physical factors can occur while manufacturing of the chips due to the limitations in processing and masking resulting in different parametric values that are permanent. This permanent process variation, in one embodiment can be used as a fingerprint to identify devices. In one aspect, the decreasing size of Complementary Metal-Oxide-Semiconductor (CMOS) transistors and lower voltage thresholds for energy efficient chip design may cause manufacturing-related process variation.

In one aspect, process variation may affect both static (or idle) and dynamic power of the chips due to, for example, different reasons: variations in leakage current and gate delays. Decreased device and interconnect dimensions may contribute to the first type of variation. For example, distribution of relatively small dopant ions may create differences in transistor threshold voltages which become significant as the device dimensions gets smaller.

Variations in leakage current may cause variations in static power (e.g., power dissipation due to sub-threshold leakage). Another type of variation may be caused by the variation in the gate length of the transistors, also known as across chip line-width variation (ACLV). Uneven etching due to local shape density, lithographic distortions and etching variations during chemical mechanical polishing process may be some of the underlying reasons of this variation. Gate delay variations may cause variations in the dynamic power of chips (e.g., the power dissipation due to charging and discharging of load capacitance). Other factors can contribute to variations in leakage current and voltage, which can result in power variation among same model production chips.

Figure 2:
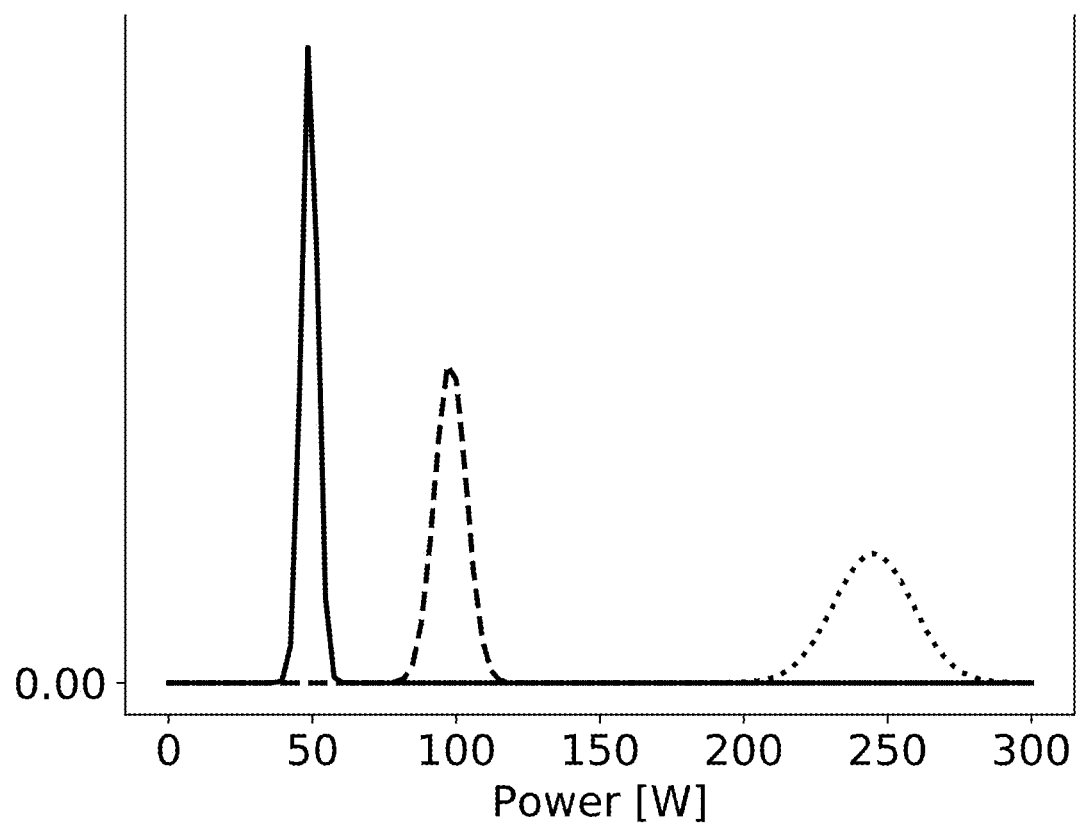
FIG. 2 shows an example result of a total CPU power distribution in one embodiment.

The following description presents how to create a hardware fingerprint of a device. Example of a device can be a mobile device. Another example of a device is a desktop device. To distinguish devices of different model, a performance profile can be sufficient. For example, a compute intensive kernel, e.g., a matrix multiply operation, can be run and using the flops count result the frequency of the CPU can be determined. Similarly, the cache size of the chips can be determined by measuring the performance of the matrix multiply with different matrix sizes. In one embodiment, devices of same model can be distinguished by profiling power and/or temperature of a component or components on a device. For example, power and/or temperature of each core in the processor such as a central processing unit (CPU) and other components on the device such as graphics and memory units can be profiled. Such a profile can help to determine the manifested hardware manufacturing differences. For example, FIG. 2 shows an example result of a total CPU power distribution. The profiling shows that probability distribution becomes wider and peak gets smaller as the number of cores in a chip increases. As there are more cores within the CPUs, the probability distribution becomes wider and more devices can be distinguished from each other since the probability of collision becomes lower.

In one embodiment, a unique fingerprint can be calculated given power distribution profile of device components. Number of possible CPU combinations increase exponentially with number of cores: # Possible CPU Configurations=Power Variation$^{Num\ Cores}$.

In one aspect, the probability of a collision among fingerprints of a number of chips may be calculated based on the non-uniform birthday problem solution as follows.

Non-uniform Birthday Problem: The birthday problem calculates the probability of two or more people having the same birthday. Let $M_r$ be the event that in a group of r people two or more having the same birthday and the complementary event $M'_r=1-M_r$, that no match occurs. Let $p_j$ be the probability that the birthday of a randomly selected person occurs on Day j of n possible days, and let $p=(p_1, p_2, p_3, \ldots, p_n)$.

In the classical birthday problem, the birth frequencies are uniform: $n^{-1}=(1/n, \ldots, 1/n)$. Then, the probability of no match for uniform birth rates becomes:

$$P\{M'_r; n^{-1}\} = \frac{n!}{n^r(n-r)!} \quad (1)$$

If the distribution is non-uniform, probability for the general distribution developed by Munford and Nunnikhoven becomes:

$$P\{M'_r; n^{-1}\} = r! S_{r,n}(p) \quad (2)$$

where $$S_{r,n}(p) = \sum_{1 \le i_1 < \ldots < i_r \le n} p_{i_1} \cdot \ldots \cdot p_{i_r} \quad (3)$$

is the coefficient of $t^r$ in the expansion of $(1+p_1 t) \times (1+p_2 t) \ldots (1+p_{n-1} t) \times (1+p_n t)$. The recursive formula for $S_{r,n}(p)$ is developed as follows:

$$S_{r,n}(p) = S_{r,n-1}(p_1, \ldots, p_{n-1}) + p_n S_{r-1,n-1}(p_1, \ldots, p_{n-1})$$

with initial conditions:

$$S_{1,j}(p_1, \ldots, p_j) = \Sigma_{i=1}^j p_i,$$

$$S_{j,j}(p_1, \ldots, p_j) = p_1 \cdot \ldots \cdot p_j \text{ for } j=1,2,\ldots,n \quad (4)$$

In one embodiment, this formula provides the probability of collision of devices given a non-uniform power distribution of a device component. Multiple components can be incorporated into the formula.

Non-uniform Birthday Problem with Independent Variables: In one embodiment, considering that the components in devices have their own power distribution that can be unique, the components can be treated as independent variables when calculating the probability of collision in power fingerprints. Given K components in a device or equivalently K independent variables, the probability becomes the dot product of the independent variables:

$$P\{M'_r; n^{-1}\} = P(k)$$

$$P(K) = P(k_1) \cdot P(k_2) \cdot \ldots \cdot P(k_K) \quad (5)$$

In one aspect, Birthday problem can be a measure to calculate the effectiveness of a fingerprint. Birthday problem can be used to calculate the probability of two or more devices having the same fingerprint. In one aspect, since the power distribution of device components is a Gaussian distribution, non-uniform birthday problem is used.

In one embodiment, power measurements of device components can be used to analyze fingerprints of different device configurations. Total power of a device can include idle/leakage (static) and active (dynamic) power. In one aspect, static power and dynamic power of the chip have different reasons for exhibiting variation and are not related to each other. In one embodiment, both idle and active power can be used as independent metrics for fingerprinting. An embodiment of a breakdown of total power of a device, e.g., CPU is shown in Equation 6. Leakage power has an exponential dependence on temperature T, where C and $k_1$, $k_2$, $k_3$ are constant values. U refers to level of system utilization and dynamic power can be described as a function of U.

$$P_{total} = P_{static} + P_{dynamic}$$

$$P_{static} = C + k_1 \times e^{k_2 \times T} \quad (6)$$

$$P_{dynamic} = k_3 \times U$$

Equation 6 shows a power model in one embodiment. In one aspect, this power model has the following implications with respect to temperature and utilization. A leakage power of the device, e.g., CPU, can depend on temperature. For example, particularly ambient/environment temperature can affect the leakage power of the chip. In one embodiment, when creating the fingerprint of the chip, a calibration may be performed depending on the environment temperature. Another temperature model can also be used. Another implication is that dynamic power of the device, e.g., CPU, can change with the utilization. In one embodiment, depending on the activity level of the device during the profile time, the power fingerprint may be calibrated. Using measurements of power and temperature at a set of utilization values, a model fitting technique can be used to derive the constant values C, $k_1$, $k_2$, $k_3$ in the model for a device, for example, for each device being considered. In one embodiment, the derived constant values can define the power fingerprint of a device. The power model shown in Equation 6 is one example of a power model. Another power model can be used. For example, other powers models can be implemented.

Static or idle power data may be measured when a device is idle, for instance, for a window of time or time period. Measurement data of power (e.g., dynamic power) can be obtained, for example, by running an activity or function on a device. For example, a double precision general matrix multiplication (DGEMM) kernel or another compute function can be run calculate the active power of a device. Another function such as a benchmarking function or activity may be selected. In one aspect, this data can be collected from an environment with stable ambient temperature with the device allocated for that task only. In such a scenario, there may be no need for temperature or utilization calibration. Data obtained from running a function or activity under such an environment on multiple devices shows that there can be power variation for all device components, e.g., with +/−3σ (standard variation). In one embodiment, measurement data of power provide battery status or how much energy is consumed per time or time period, for instance, average power consumption.

In one embodiment, static and dynamic power can be used as independent metrics for fingerprinting. A chip with high static power can have low active power. In one embodiment, the system and method can uniquely fingerprint or identify devices, which may have different device configurations with different power consumption and variation levels.

Figure 3:
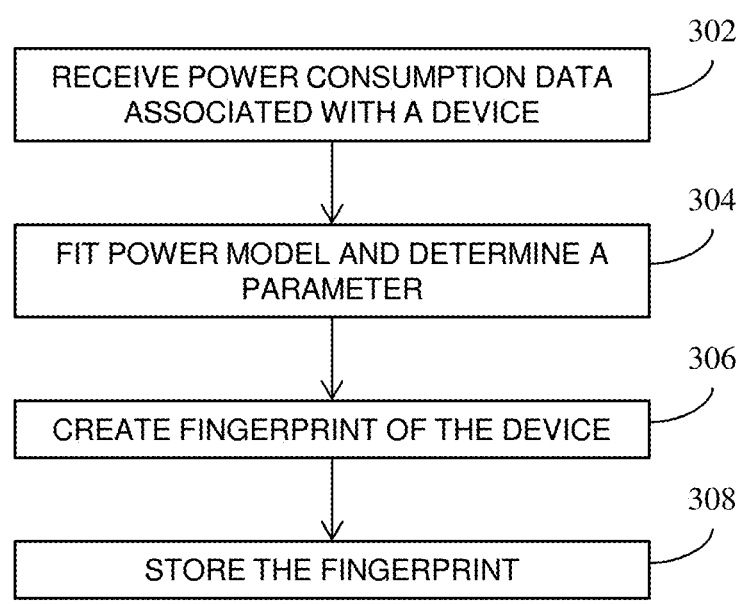
FIG. 3 is flow diagram illustrating a method in one embodiment.

FIG. 3 is flow diagram illustrating a method in one embodiment. At 302, measurement data of power consumption of a device is received. Measurement data of power consumption is also referred to as power consumption data. In one embodiment, measurement data of power consumption of a device includes power consumption of components, for instance, individual components, of the device. Examples of the components may include, but are not limited to, a core, a memory, a processor or processing unit such as a graphics processing unit, field programmable gate array (FPGA), and/or others. In one embodiment, power consumption of the components in the device can be combined and provided as the device's power consumption. An example of a device is a mobile device. Another example is a desktop computer device. A device can be computer device or processor device.

In one embodiment, power consumption data can be collected or obtained by running a benchmark activity such as a multi threaded compute intensive benchmark. In one aspect, the core count and frequency of the device or chip (IC of the device) can be identified by observing the performance of a multi threaded compute intensive benchmark. Power consumption, temperature and performance can be observed while running one or more benchmarks that stress each component of the device or chip such as a core, memory, GPU, and/or another processing unit. In one embodiment, to identify component count such as the number of cores, a parallel compute intensive application with various thread/process counts can be run, and the performance and/or execution time observed. For example, consider that on 1 thread (core), execution time is 100 seconds, on 2 threads (cores) it is expected to be 50 seconds, on 4 threads (cores) 25 seconds if four cores are available. By profiling an application performance, for instance, as described above, one can determine the core count. In one aspect, frequency may be determined similarly by measuring the floating point operations per second (FLOPs).

At 304, a power model is fitted to the power consumption data and at least one parameter of the power model is determined based on the fitting. The power model can be a function of static power, dynamic power. The power model can be a function of static power, dynamic power, and temperature. The power model can be a function of static power, dynamic power, temperature and utilization. Another power model can be used.

At 306, a fingerprint of the device can be created based on the at least one parameter. For instance, the at least one parameter can be defined as a fingerprint of the device or a part of the fingerprint of the device.

At 308, the fingerprint of the device is stored, for example, formatted as a structured data with the device identification and the fingerprint which associates the fingerprint with the device. In one aspect, resulting power profile may be stored as device fingerprint. For example, as shown in Equation (6), each device power profile can be represented or broken down into these equations. These equations have constant values that are device specific, unique for each device. In one embodiment, using all the measurements of power and temperature at a set of utilization values, a model fitting technique can be used to derive the constant values, e.g., C, k1, k2, k3 in the model for each device, which define the power fingerprint. In one aspect, even same-model devices can have differences in these constant values. Additionally, in one embodiment, a database can store the raw values of collected power and temperature measurements for each component.

In one aspect, the fingerprinting of a device may be performed based on receiving permission from a user of the device, or opt-in/opt-out basis. In one embodiment, the method may be performed for multiple devices, and each of the multiple devices can have a power profile stored in a database.

In one embodiment components (such as CPU, GPU, memory, disk, and/or others) in a mobile device or another device such as a desktop processor, may be used to profile their leakage and switching power and to create a digital fingerprint of the device using the power and performance characteristics. In one embodiment, a device may be profiled under workloads with different characteristics. In one embodiment, a system and/or method may create a fingerprint of a mobile or a desktop device that is composed of multiple types of units that may have ICs. To fingerprint such a device, in one embodiment, a system and/or method may run multiple software workloads on the device to profile the power consumption and performance characteristics of the device components. In one embodiment, different software workloads may be run on the device to analyze power and performance characteristics. A system and/or method in one embodiment may use the battery drain information of the mobile or desktop device (or another device). Running different software workloads can stress different parts of the device and a fingerprint profile can be created considering the stresses on different parts. In one embodiment, these workloads can be run via an app (or application) installed on the device or through a browser page, or through another mechanism. In one embodiment, running of such apps on the device may be triggered from a system performing a fingerprint analysis. For instance, such a system may cause the running of a software workload, for example, to collect measurement data.

Figure 4:
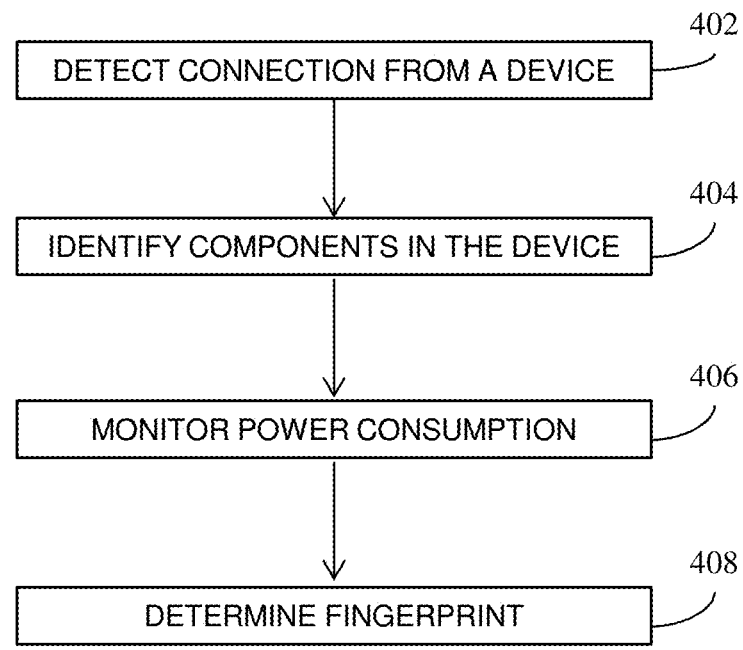
FIG. 4 is a flow diagram illustrating a method of identifying a device based on a fingerprint of the device in one embodiment.

FIG. 4 is a flow diagram illustrating a method of identifying a device based on a fingerprint of the device in one embodiment. In one aspect, a system and method can be implemented as software running on a hardware processor. Such software can extract a fingerprint of a device using power consumption data of the device components such as cores. In another aspect, method may be coded on a hardware processor. For instance, the method may be implemented and/or run on one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

At 402, a connection from a device is detected, for instance, by a computer. As an example, the computer may be running or providing a web service. For instance, the device may connect via an app, a browse, or another, to such as web service. In one aspect, at 404, responsive to detecting that the device is connected, a web-service (or the computer) may trigger a code to execute on the device. Performance, power, temperature characteristics of the device while executing the code can be collected and the web-service may receive the data. The web-service may analyze the data and identify the number of components (e.g., core(s), memory device(s), processor(s)) in the device (e.g., an IC or chip of the device) by looking at the performance of a threaded code. For instance, core count or component count and frequency of the chip can be identified by observing the performance of a multi-threaded DGEMM-like benchmark.

At 406, power consumption of the device is monitored or measured. For instance, the device's energy consumption over time can be measured. For example, responsive to identifying the components and/or the number of components, the web service may trigger or cause a characterization test code to execute, one by one at each component such as a core while monitoring the power consumption. In one aspect, existing benchmarks that characterize ICs can be used.

At 408, the device's fingerprint is determined by fitting a power consumption model and determining at least one parameter. Extracted power profile (e.g., fingerprint) can be stored in a database as a fingerprint. In one embodiment, a power profile may include the power model for each device component. In addition, collected raw power and temperature data can also be stored in the database.

In one embodiment, for each connected device, the database can be searched for existing fingerprints. Related data associated with a connected device may be also stored. Examples of related data may include a device user's login and password information.

Figure 5:
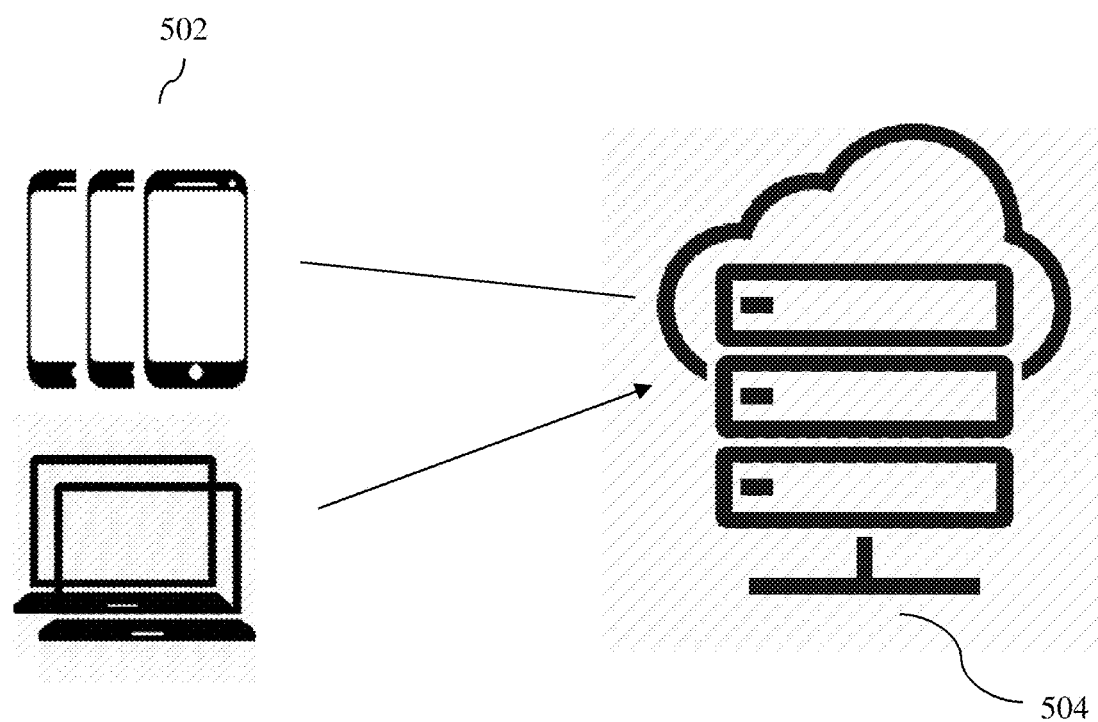
FIG. 5 is a diagram illustrating a device connecting to a computer system in one embodiment.

FIG. 5 is a diagram illustrating a device connecting to a computer system in one embodiment. A device 502 such as a mobile device, desktop computer, and/or another device may connect to another device, e.g., computer system 504, for example, via a network. For instance, the computer system may be running a web site, a web service may be a service system, and/or another. The computer system 504 may detect a connection and perform fingerprinting of the device, for instance, as described above. In one aspect, fingerprint of the device can be used to identify the device, for instance, for authentication purposes, where the connecting device's fingerprint is compared with a stored fingerprint.

Figure 6:
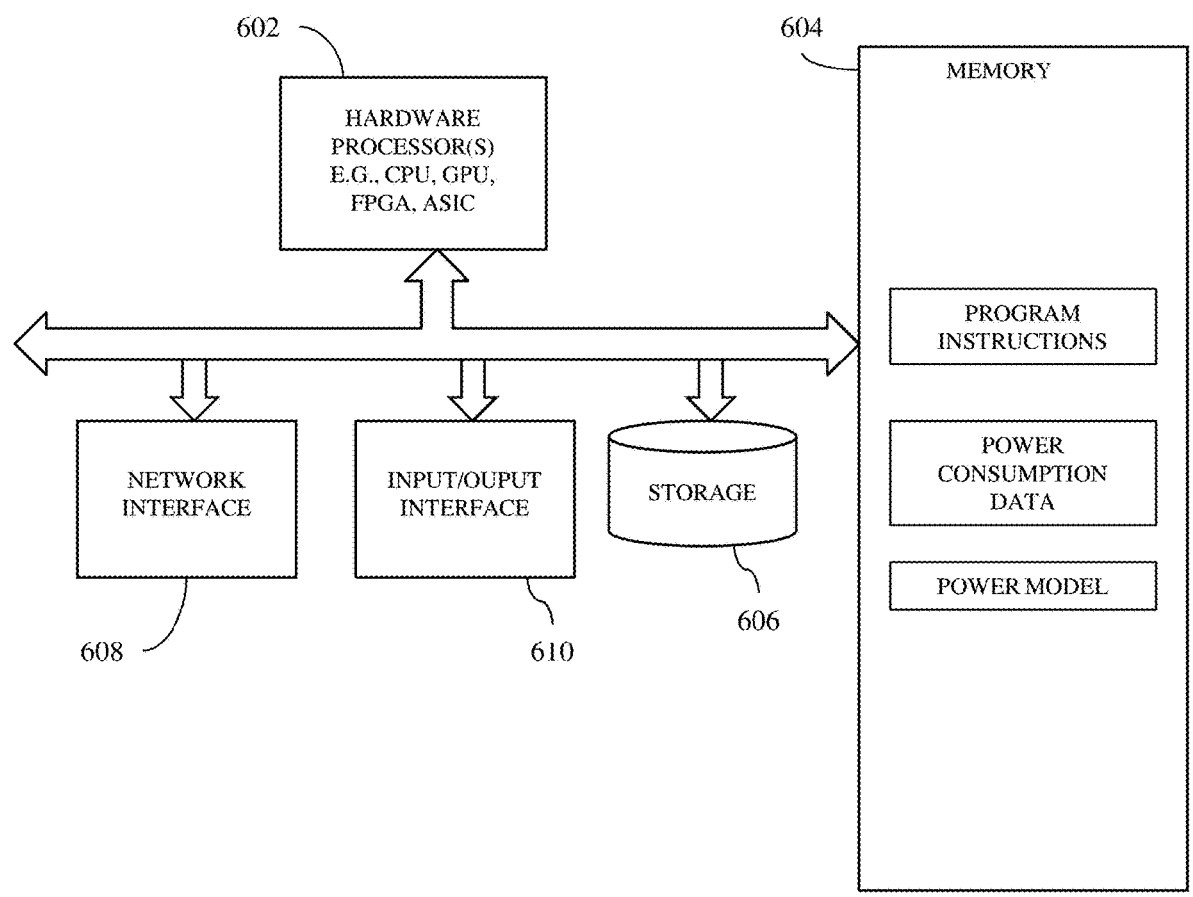
FIG. 6 is a diagram showing components of a system in one embodiment, which can determine a device's fingerprint.

FIG. 6 is a diagram showing components of a system in one embodiment, which can determine a device's fingerprint. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and determine and/or create a fingerprint associated with a device. The memory device may include random access memory (RAM), read-only memory (ROM) or another memory device, and may store data and/or processor instructions for implementing various functionalities associated with the methods and/or systems described herein. One or more processors may execute computer instructions stored in the memory or received from another computer device or medium. The memory device 604 may, for example, store instructions and/or data for functioning of one or more hardware processors 602, and may include an operating system and other program of instructions and/or data. One or more hardware processors 602 may receive power consumption data associated with a device. For instance, at least one hardware processor 602 may fit a power model to the power consumption data and determine a fingerprint associated with the device. In one aspect, such power consumption data may be stored in a storage device 606 or received via a network interface 608 from a remote device, and may be temporarily loaded into the memory device 604. The determined fingerprint may be stored, for example, a storage device 606. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

In one embodiment, device identification can be determined based on CMOS manufacturing differences in processors. For instance, there may be different types of power variations: environmental and physical. Environmental factors can occur during the activity of the chip due to variations in power supply, switching activity and temperature of the cores. Physical factors can occur while manufacturing of the chips, for example, due to conditions in processing and masking, resulting in different parametric values that can be permanent. A system and/or method in one embodiment may determine device identification based on these physical permanent variations. In one aspect, manufacturing-related process variation can be caused by the decreasing size of (CMOS) transistors and lower voltage thresholds for energy efficient chip design. As a result, variations in leakage current, gate delays can occur. In one aspect, such variations show themselves as power and voltage differences among components such as cores and chips. By looking at the power efficiency level of each component (e.g., a core or another component), a system and/or method in one embodiment can fingerprint the device. As the number of components such as cores increase in a chip, the number of possibilities (unique fingerprints) increases exponentially, e.g., (power variation)^(number of cores). In one aspect, because device fingerprinting is hardware based, software updates or factory resets would not erase fingerprint.

In one aspect, a method may be provided which can detect whether a device is being identified by its power consumption. For instance, in one aspect, power fingerprinting may be detected based on detecting power consumption differences or anomalies, which may occur, for instance, during running of one or more benchmarking workloads.

Figure 7:
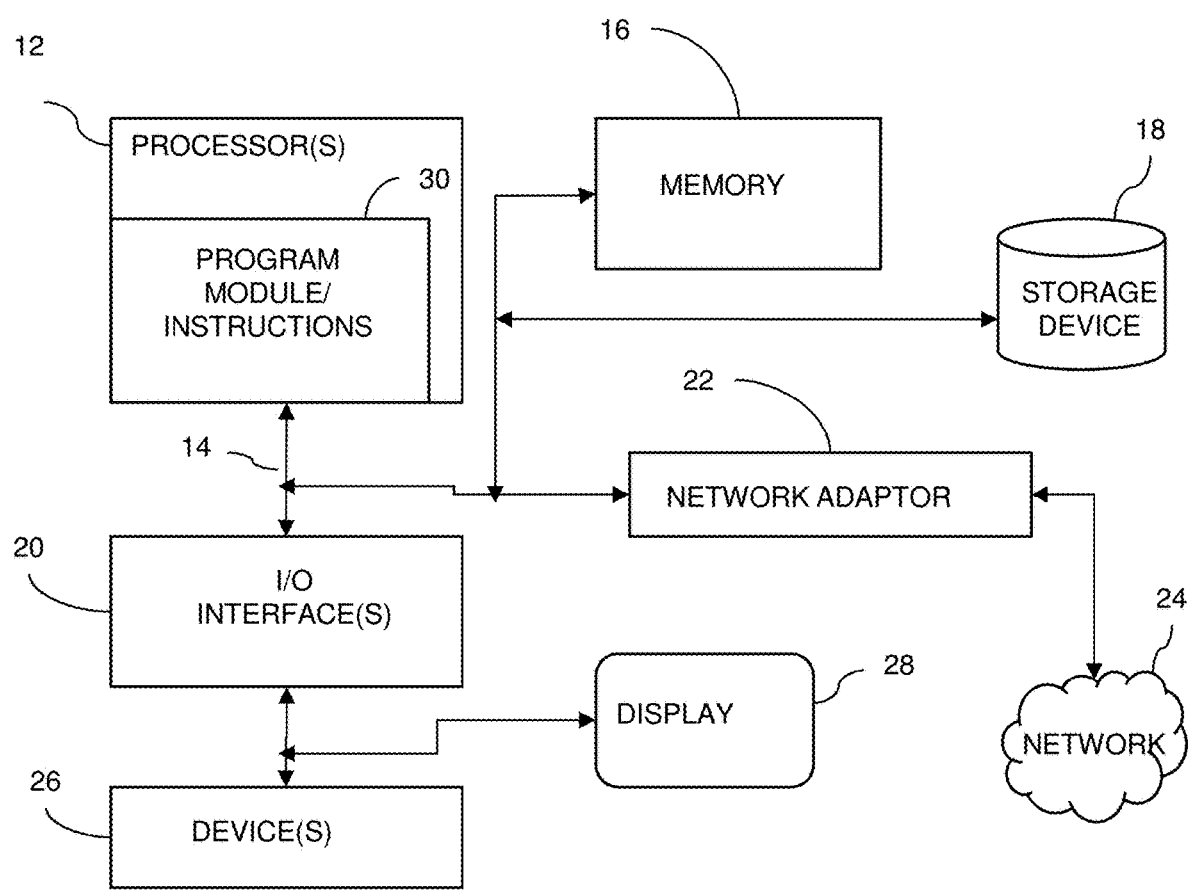
FIG. 7 illustrates a schematic of an example computer or processing system that may implement a system according to one embodiment.

FIG. 7 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
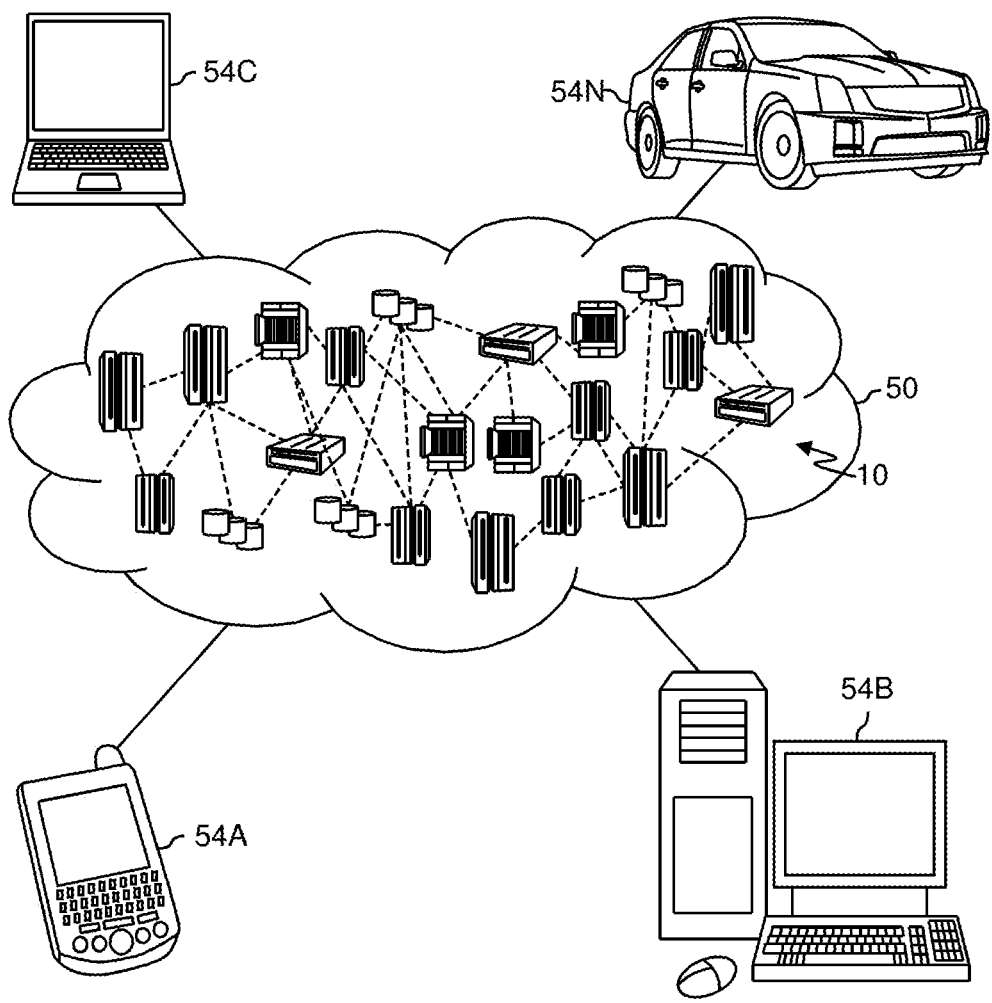
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
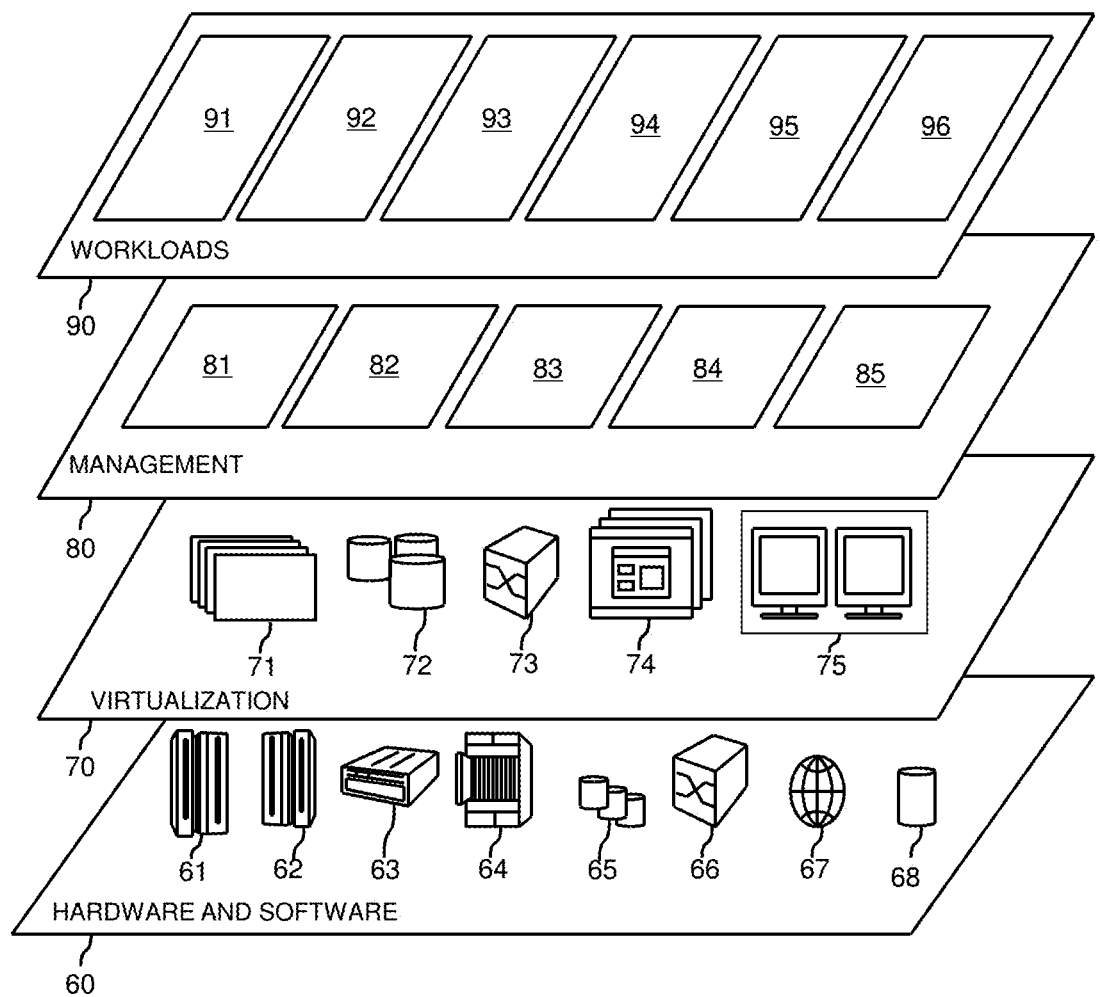
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device fingerprint processing 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving power consumption data associated with a device;
   fitting a power model to the power consumption data and determining at least one parameter derived by the fitting; and
   creating a fingerprint of the device based on the at least one parameter, the at least one parameter being a constant value that defines a unique power fingerprint of the device,
   wherein the power model is a function of static power consumption computed as $C+k_1 \times e^{k_2 \times T}$ and dynamic power consumption computed as $k_3 \times U$, wherein T is a temperature measurement a set of utilization values U, wherein parameters C, k1, k2, k3 are determined by the fitting.

2. The method of claim 1, wherein a manufacturing characteristic of the device contributes to power consumption specified in the power consumption data.

3. The method of claim 1, further comprising storing the fingerprint of the device.

4. The method of claim 1, wherein the power consumption data comprises power consumption associated with individual components in the device.

5. The method of claim 1, further comprising causing different apps that stress different parts of the device to run on the device, and wherein the power consumption data is obtained from running the different apps.

6. The method of claim 1, wherein the fingerprint can be used to authenticate the device.

7. The method of claim 1, wherein the fingerprint can be used for protecting a computer from a malicious attack.

8. A system, comprising:
   at least one hardware processor coupled with a memory device, the at least one hardware processor operable to at least:
   receive power consumption data associated with a device, wherein a manufacturing characteristic of the device contributes to power consumption specified in the power consumption data;
   fit a power model to the power consumption data and determine at least one parameter derived by fitting the power model; and
   create a fingerprint of the device based on the at least one parameter, the at least one parameter being a constant value that defines a unique power fingerprint of the device,
   wherein the power model is a function of static power consumption computed as $C+k_1 \times e^{k_2 \times T}$ and dynamic power consumption computed as $k_3 \times U$, wherein T is a temperature measurement a set of utilization values U, wherein parameters C, k1, k2, k3 are determined by the fitting.

9. The system of claim 8, wherein the at least one hardware processor is further operable to store the fingerprint of the device.

10. The system of claim 8, wherein the power consumption data comprises power consumption associated with individual components in the device.

11. The system of claim 10, wherein the at least one hardware processor is further operable to cause different apps that stress different parts of the device to run on the device, and wherein the power consumption data is obtained from running the different apps.

12. The system of claim 8, wherein the fingerprint can be used to authenticate the device.

13. The system of claim 8, wherein the fingerprint can be used for protecting a computer from a malicious attack.

14. A computer program product comprising a computer readable storage medium having program instructions embodied therewith, the program instructions executable by a computer to cause the computer to:
   receive, by the computer, a communication from a device;
   monitor, by the computer, power consumption of the device; and
   based on the power consumption, identify, by the computer, the device,
   wherein the power consumption is used to fit a power model to derive a plurality of constant values, which define a unique power fingerprint of the device, the device being identified by the unique power fingerprint,
   wherein the power model is a function of static power consumption computed as $C+k_1 \times e^{k_2 \times T}$ and dynamic power consumption computed as $k_3 \times U$, wherein T is a temperature measurement a set of utilization values U, wherein C, k1, k2, k3 are determined by the fitting.

15. The computer program product of claim 14, wherein a manufacturing characteristic of the device contributes to power consumption specified in the power consumption data.

16. The computer program product of claim 14, wherein the power consumption data comprises power consumption associated with individual components in the device.

17. The computer program product of claim 14, wherein the device is further caused to cause different apps that stress different parts of the device to run on the device, and wherein the power consumption data is obtained from running the different apps.

18. The computer program product of claim 14, wherein the fingerprint can be used to authenticate the device.

19. The computer program product of claim 14, wherein the fingerprint can be used for protecting a computer from a malicious attack.

\* \* \* \* \*